US010246260B2

(12) United States Patent
Hartung (10) Patent No.: US 10,246,260 B2
(45) Date of Patent: Apr. 2, 2019

(54) RETURN DEVICE FOR EMPTIES

(71) Applicant: Wincor Nixdorf International GmbH, Paderborn (DE)

(72) Inventor: Domenic Hartung, Molsdorf (DE)

(73) Assignee: Wincor Nixdorf International GmbH, Paderborn (DE)

( * ) Notice: Subject to any disclaimer, the term of this patent is extended or adjusted under 35 U.S.C. 154(b) by 0 days.

(21) Appl. No.: 15/438,802

(22) Filed: Feb. 22, 2017

(65) Prior Publication Data

US 2017/0240357 A1   Aug. 24, 2017

(30) Foreign Application Priority Data

Feb. 22, 2016  (EP) .................................... 16156673

(51) Int. Cl.
*B65G 67/12* (2006.01)
*B65G 11/10* (2006.01)
(Continued)

(52) U.S. Cl.
CPC ............ *B65G 11/103* (2013.01); *B65G 15/14* (2013.01); *B65G 43/08* (2013.01); *G07F 7/0609* (2013.01)

(58) Field of Classification Search
CPC .... B65G 11/063; B65G 11/103; B65G 65/30; B65G 65/31; B65G 65/32; B65G 67/12
(Continued)

(56) References Cited

U.S. PATENT DOCUMENTS 2,815,113 A * 12/1957 Henderson ........... B65G 47/252
193/44
2,874,856 A * 2/1959 Jeremiah ................ B65G 65/32
193/27
(Continued)

FOREIGN PATENT DOCUMENTS

DE      10207405 A1   9/2003
DE   102010040177 A1   3/2012
(Continued)

OTHER PUBLICATIONS

European Search Report based on application No. 16156673.2 (9 pages) dated May 12, 2016 (for reference purpose only).
(Continued)

*Primary Examiner* — Joseph A Dillon, Jr.
(74) *Attorney, Agent, or Firm* — Black, McCuskey, Souers & Arbaugh, LPA (57) ABSTRACT

A return device for empties includes a housing; an empties-introduction opening by way of which empties are introducible; a conveying mechanism disposed in the housing and by which empties that have been introduced can be conveyed away. The mechanism has an empties-receptacle portion facing the opening and by which the empties from the opening reach the mechanism. The portion is disposed to be adjacent to the opening and spaced apart therefrom such that a gap is present between the opening and the portion. The device further includes an optical detection device disposed in the housing adjacent to the opening, so as to be able to optically detect in an at least substantially encircling manner introduced empties; and a web extending in a region between a lower portion of the opening and the portion, to be able to serve as a bearing for the empties at least partially bridges the gap.

11 Claims, 6 Drawing Sheets

(51) Int. Cl.
*B65G 15/14* (2006.01)
*B65G 43/08* (2006.01)
*G07F 7/06* (2006.01)

(58) Field of Classification Search
USPC ............... 198/562; 193/3; 414/299; 312/211, 312/350; 194/212; 382/142
See application file for complete search history.

(56) References Cited

U.S. PATENT DOCUMENTS

| | | | | |
|---|---|---|---|---|
| 3,750,877 | A * | 8/1973 | Dvacho | B07C 5/3404 209/588 |
| 3,858,711 | A * | 1/1975 | Barker | B65G 37/005 198/562 |
| 4,026,425 | A * | 5/1977 | Gruodis | B65G 47/44 193/2 R |
| 4,066,158 | A * | 1/1978 | Hare | B65G 11/123 193/34 |
| 4,454,028 | A * | 6/1984 | Vetter | B07C 5/00 194/212 |
| 4,472,819 | A * | 9/1984 | Constantino | G07F 7/0609 194/212 |
| 5,350,120 | A * | 9/1994 | Melchionna | B02C 19/0087 241/5 |
| 5,469,783 | A * | 11/1995 | Fry | B30B 9/325 100/173 |
| 6,186,308 | B1 * | 2/2001 | Coyne | G07F 7/0609 194/209 |
| 6,575,290 | B2 * | 6/2003 | Loning et al. | B08B 9/28 198/494 |
| D477,366 | S * | 7/2003 | Tandberg | D20/8 |
| 6,857,453 | B2 * | 2/2005 | Nishino | G01G 17/06 141/144 |
| 8,607,964 | B2 * | 12/2013 | Kheifets | B65G 43/08 193/21 |
| 10,040,644 | B2 * | 8/2018 | Schroeder | B65G 51/00 |
| 2002/0011260 | A1 * | 1/2002 | Loning | B08B 9/28 134/104.2 |
| 2003/0010597 | A1 * | 1/2003 | Kiva | B07C 5/3412 194/208 |
| 2004/0046028 | A1 * | 3/2004 | Guntveit | B07C 5/3404 235/462.14 |
| 2004/0190765 | A1 * | 9/2004 | Tvinnereim | B07C 5/3408 382/142 |
| 2007/0163212 | A1 * | 7/2007 | Varhaniovsky | B65G 15/14 53/471 |
| 2007/0209458 | A1 * | 9/2007 | Bruland | B65G 69/16 74/84 R |
| 2007/0235286 | A1 * | 10/2007 | Perazzo | B65G 47/1464 198/397.01 |
| 2010/0026807 | A1 * | 2/2010 | Sæther | G01N 21/8806 348/150 |
| 2010/0102126 | A1 * | 4/2010 | Benson | G07F 17/12 235/381 |
| 2010/0218849 | A1 * | 9/2010 | Hagano | B60K 15/04 141/350 |
| 2011/0180463 | A1 * | 7/2011 | Jokhovets | B07C 5/3408 209/524 |
| 2011/0245965 | A1 * | 10/2011 | Farrell | G06Q 20/20 700/232 |
| 2012/0068584 | A1 | 3/2012 | Wind | |
| 2012/0173014 | A1 | 7/2012 | Morishita et al. | |
| 2013/0334009 | A1 * | 12/2013 | Pac Gracia | B65G 19/02 198/459.8 |
| 2014/0210967 | A1 * | 7/2014 | Kirkerud | G07F 7/0609 348/61 |
| 2014/0218510 | A1 * | 8/2014 | Nordbryhn | G07F 7/0609 348/131 |
| 2015/0246771 | A1 * | 9/2015 | Lavoie | G07F 7/06 414/293 |
| 2015/0248804 | A1 * | 9/2015 | Hannawa | B30B 9/321 700/232 |
| 2016/0182861 | A1 * | 6/2016 | Baitz | G07F 7/0609 348/61 |
| 2017/0117891 | A1 * | 4/2017 | Lohbihler | G08C 17/02 |

FOREIGN PATENT DOCUMENTS

| | | |
|---|---|---|
| DE | 202014002768 U1 | 4/2014 |
| EP | 2290624 A1 | 3/2011 |
| EP | 2363837 A1 | 9/2011 |
| EP | 2378494 A2 | 10/2011 |
| EP | 2538392 A1 | 12/2012 |
| EP | 2538393 A1 | 12/2012 |
| EP | 2684618 A1 | 1/2014 |
| EP | 2689922 A1 | 1/2014 |
| WO | 9802853 A1 | 1/1998 |

OTHER PUBLICATIONS

European office action issued in the corresponding European patent application; 6 pages.

* cited by examiner

RETURN DEVICE FOR EMPTIES

CROSS-REFERENCE TO RELATED APPLICATION

This application claims priority to European Patent Application Serial No. 16 156 673.2, which was filed Feb. 22, 2016, and is incorporated herein by reference in its entirety.

TECHNICAL FIELD

Various embodiments relate generally to a return device for empties.

SUMMARY

A return device for empties includes a housing; an empties-introduction opening by way of which empties are introducible; a conveying mechanism disposed in the housing and by which empties that have been introduced can be conveyed away. The mechanism has an empties-receptacle portion facing the opening and by which the empties from the opening reach the mechanism. The portion is disposed to be adjacent to the opening and spaced apart therefrom such that a gap is present between the opening and the portion. The device further includes an optical detection device disposed in the housing adjacent to the opening, so as to be able to optically detect in an at least substantially encircling manner introduced empties; and a web extending in a region between a lower portion of the opening and the portion, to be able to serve as a bearing for the empties at least partially bridges the gap.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

A return device for empties by way of which an introduction of empties into the device can be performed in an error-free manner is achieved by various embodiments.

Various embodiments provide a return device for empties, having a device housing which has a housing wall; an empties-introduction opening which is configured in the housing wall and by way of which empties are introducible along an introduction direction into the return device for empties; a conveying mechanism which is disposed in the device housing and by which empties that have been introduced by way of the empties-introduction opening can be conveyed away, wherein the conveying mechanism has an empties-receptacle portion which faces the empties-introduction opening and by way of which the empties emanating from the empties-introduction opening reach the conveying mechanism, wherein the empties-receptacle portion is disposed so as to be adjacent to the empties-introduction opening and spaced apart therefrom in the introduction direction such that a gap that is defined by the spacing is present between the empties-introduction opening and the empties-receptacle portion; an optical detection device which is disposed in the device housing so as to be adjacent to the empties-introduction opening and so as to be at least partially about the latter, so as to be able to optically detect in an at least substantially encircling manner empties that are introduced by way of the empties-introduction opening; and a web which in the introduction direction extends in a region between a lower portion of the empties-introduction opening and the empties-receptacle portion of the conveying mechanism, so as to on account thereof be able to serve as a bearing for the empties that in the introduction direction at least partially bridges the gap.

Empties can be, for example, a bottle, for example a bottle with a refundable deposit, for example a single-use or a multiple-use bottle, or a can, for example from a plastics material or metal.

In some embodiments, one or a plurality of optical characteristics for identifying a type of the respective empties, for example in the form of a one-dimensional or multi-dimensional barcode or of a QR code, or in the form of a logo or of another optical representation of a type of the respective empties, is/are attached to the empties. This one optical characteristic or this plurality of optical characteristics is/are detected by means of the optical detection device, and the type of empties that is associated with the detected optical characteristic(s) is established by a processor, for example a computer (for example using a database (a central database, for example) in which a multiplicity of predefined optical characteristics that each are assigned to one or a plurality of types of empties are stored).

In that the web at least partially bridges the gap from below it can be prevented, for example, that empties are caught in the gap, on account of which a device error by way of empties being blocked in the introduction region could otherwise arise. The web which per se is configured so as to be narrower in relation to the opening, for example, furthermore allows the optical detection device to also be able to optically detect the empties that are located on the web from below, for example laterally past the web, on account of which empties-detection errors can be avoided, for example, and the frequency of empties-detection errors can be reduced, for example.

According to the function, the web at least substantially extends at a/the height level of the lower portion of the empties-receptacle opening, so as to on account thereof be able to serve as the mentioned bridging bearing without impeding the conveying path of the empties from the empties-introduction opening to the conveying mechanism and/or to the empties-receptacle portion of the conveying mechanism (in) such (a manner) that there would be any risk of congestion and/or path blocking.

The return device for empties can be provided with a sleeve, for example, which extends along an internal circumference of the empties-introduction opening, wherein the web extends in an integral manner from a lower portion of the sleeve in the empties-introduction direction, for example extending in a freely protruding manner. That is to say that the web is thus integrally, that is to say in a materially-integral manner, for example, formed with the sleeve (on the lower portion thereof). The sleeve extends about an internal circumference of the empties-introduction opening in an at least substantially closed manner, for example.

The web can be fixedly connected to the housing wall, for example, and extend from the lower portion of the empties-introduction opening in the direction toward the empties-receptacle portion, for example extending in a freely protruding manner. This aforementioned embodiment can be carried out by means of the previously explained sleeve structure, for example, but can also be achieved in another way, for example, in that the web on an end portion that faces the housing wall has a flange that is directed only downward, for example, by means of which the web is fastened to the housing wall. The web herein (conjointly with the flange thereof) in the lateral view (transversely to the empties-introduction direction) can have an angular shape, for example a shape that is at least substantially rectangular.

The web can at least in part have a shape that is elongate in the introduction direction, for example, having a width (transverse to a passage axis that in the plan view of the device runs centrically through the empties-introduction opening) which at maximum is the size of half or a quarter (or at maximum the size of ⅙ or ⅛) of a (the) mean diameter and/or of a (the) circumferential diameter of the empties-introduction opening. The web is configured as a central web, for example, which in the plan view extends centrically in and along a passage axis that extends through the center of the empties-introduction opening. The web and/or the central web however extend/extends at a/the height level of the lower portion of the empties-introduction opening.

The web can have a lip, or can be formed by a lip, for example, which from the introduction opening tapers off along the introduction direction up to a free end portion that faces the empties-receptacle portion and transversely to the introduction direction has a width (transverse to a passage axis that in the plan view of the device runs centrically through the empties-introduction opening) which at maximum is the size of half or a quarter (or at maximum the size of ⅙ or ⅛) of a (the) mean diameter and/or of a (the) circumferential diameter of the empties-introduction opening.

The lip digressively tapers off (in the empties-introduction direction) on both sides (on both sides of a passage axis that in the plan view of the device runs centrically through the empties-introduction opening), for example, such that the lip has concave lateral peripheries that in the width direction are mutually opposite. This embodiment, at a relatively wide and thus secure bearing on the web, for example, can nevertheless guarantee an adequate field of view from (laterally) below, such that empties that are located on the web can be optically detected by the optical detection device by way of/through the concave lateral peripheries (that is to say past the latter).

The lip can have a double lip, for example, having a first and a second lip, which each extend from the empties-introduction opening in the introduction direction up to a free end portion, for example extending in a freely protruding manner, and which each have an elongate shape in the introduction direction, for example. The first and the second lip are disposed transversely to the introduction direction at a mutual transverse lip spacing such that empties that are located on the web are optically detectable by the optical detection device also through an intermediate lip gap that is defined by the transverse lip spacing between the first and the second lip.

The web can have a first set and a second set of fins that are disposed so as to be mutually adjacent at a fin spacing and have a respective fin face, for example, said fins by way of the fin faces thereof each extending at least substantially parallel with the introduction direction and at least substantially radially to the empties-introduction opening such that empties that are located on the web are optically detectable by the optical detection device also through intermediate fin gaps that are defined by the (mentioned) fin spacings (which are transverse to the fin faces) between the fins.

The first set of fins and the second set of fins can be disposed on mutually opposite sides (transverse to a passage axis that in the plan view of the device runs centrically through the empties-introduction opening) of the web of elongate shape, for example, said web thus representing/forming a central web, for example, which in the plan view of the device runs in and along the passage axis that runs centrically through the empties-introduction opening. The fins that are configured laterally to the (central) web of elongate shape can improve the bearing of the empties, for example, wherein by virtue of the intermediate fin gaps (that is to say of the gaps between the (adjacent) fins) there is nevertheless an adequate field of view by way of which the optical detection system can optically detect empties that are present/located on the web and/or on the fins.

The web can have a transparent material, or be configured from a transparent material, for example, such that the optical detection device can optically detect empties that are located on the web through the web.

Furthermore, a return device for empties is provided, having a device housing which has a housing wall; an empties-introduction opening which is configured in the housing wall and by way of which empties are introducible along an introduction direction into the return device for empties; a conveying mechanism which is disposed in the device housing and by which empties that have been introduced by way of the empties-introduction opening can be conveyed away, wherein the conveying mechanism has an empties-receptacle portion which faces the empties-introduction opening and by way of which the empties emanating from the empties-introduction opening reach the conveying mechanism, wherein the empties-receptacle portion is disposed so as to be adjacent to the empties-introduction opening and spaced apart therefrom in the introduction direction such that a gap that is defined by the spacing is present between the empties-introduction opening and the empties-receptacle portion; an optical detection device which is disposed in the device housing so as to be adjacent to the empties-introduction opening and so as to be at least partially about the latter, so as to be able to optically detect in an at least substantially encircling manner empties that are introduced by way of the empties-introduction opening; and a sleeve which extends about the internal circumference of the empties-introduction opening in an at least substantially closed manner and which extends from the empties-introduction opening in the introduction direction to the empties-receptacle portion of the conveying mechanism, on account of which the sleeve by way of a lower portion thereof serves as a bearing for the empties that in the introduction direction at least partially bridges the gap, and wherein the sleeve at least in the lower portion thereof has a transparent material, or is formed from a transparent material, such that the optical detection device can optically detect empties that are located on the lower portion of the sleeve through this lower portion of the sleeve.

The conveying mechanism can have a first and a second conveyor belt that are elongate in the introduction direction, for example, having a correspondingly elongate conveyor-belt face, wherein the conveyor belts in relation to a longitudinal axis that extends in the introduction direction and runs between the conveyor belts and that in the plan view of the device runs through the center of the empties-introduction opening are disposed so as to be at least substantially symmetrical, and wherein the web, for example, to the extent that the latter is present, likewise in relation to this longitudinal axis, is configured so as to be at least substantially symmetrical.

The optical detection system can have, for example, one or a plurality of cameras and/or one or a plurality of barcode scanners and/or even other optical sensors.

The housing wall can be formed by a pivotable apparatus door of the return device for empties, for example, wherein the optical detection system and the web are attached to the internal side of the apparatus door such that the optical detection system and the web upon pivoting opening of the apparatus door are conjointly pivoted and thus can be rendered accessible. The conveying mechanism on its part is fixedly installed in the interior of the housing, for example so as to be fixed to the device housing, for example in a stationary housing body that is separate from the apparatus door (and is thus not provided to be conjointly pivotable with the apparatus door, for example).

Figure 1:
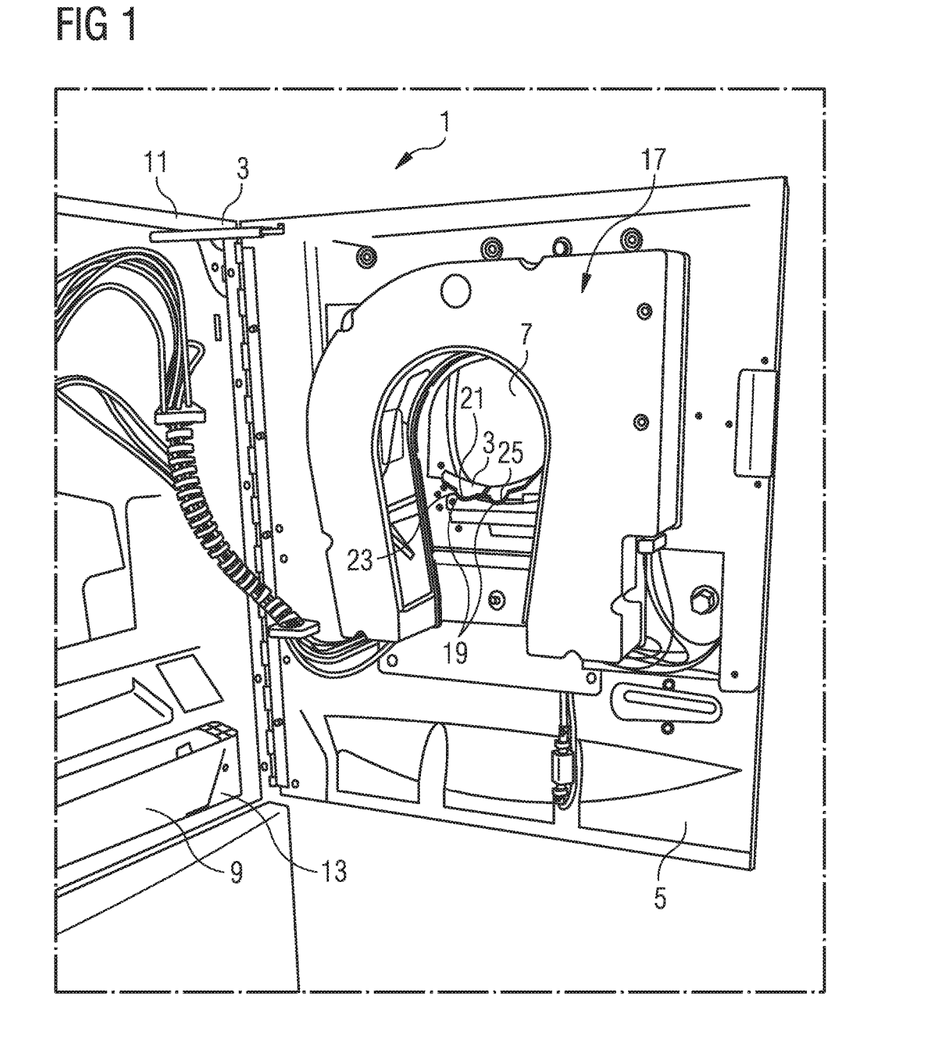
FIG. 1 shows a perspective view of return device for empties according to a first embodiment, with the (front) apparatus door opened.
Figure 2:
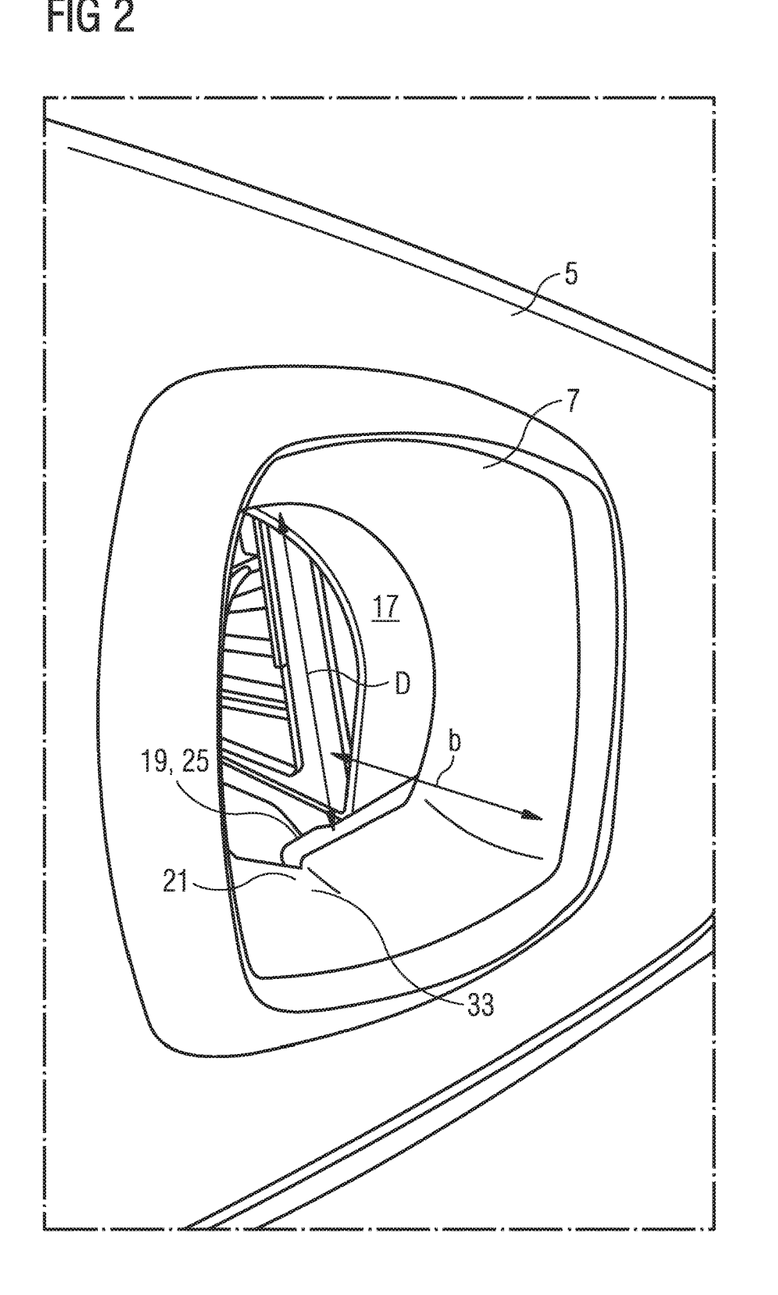
FIG. 2 shows a perspective view, obliquely from the front, of an empties-introduction opening of the return device for empties of FIG. 1.
Figure 3:
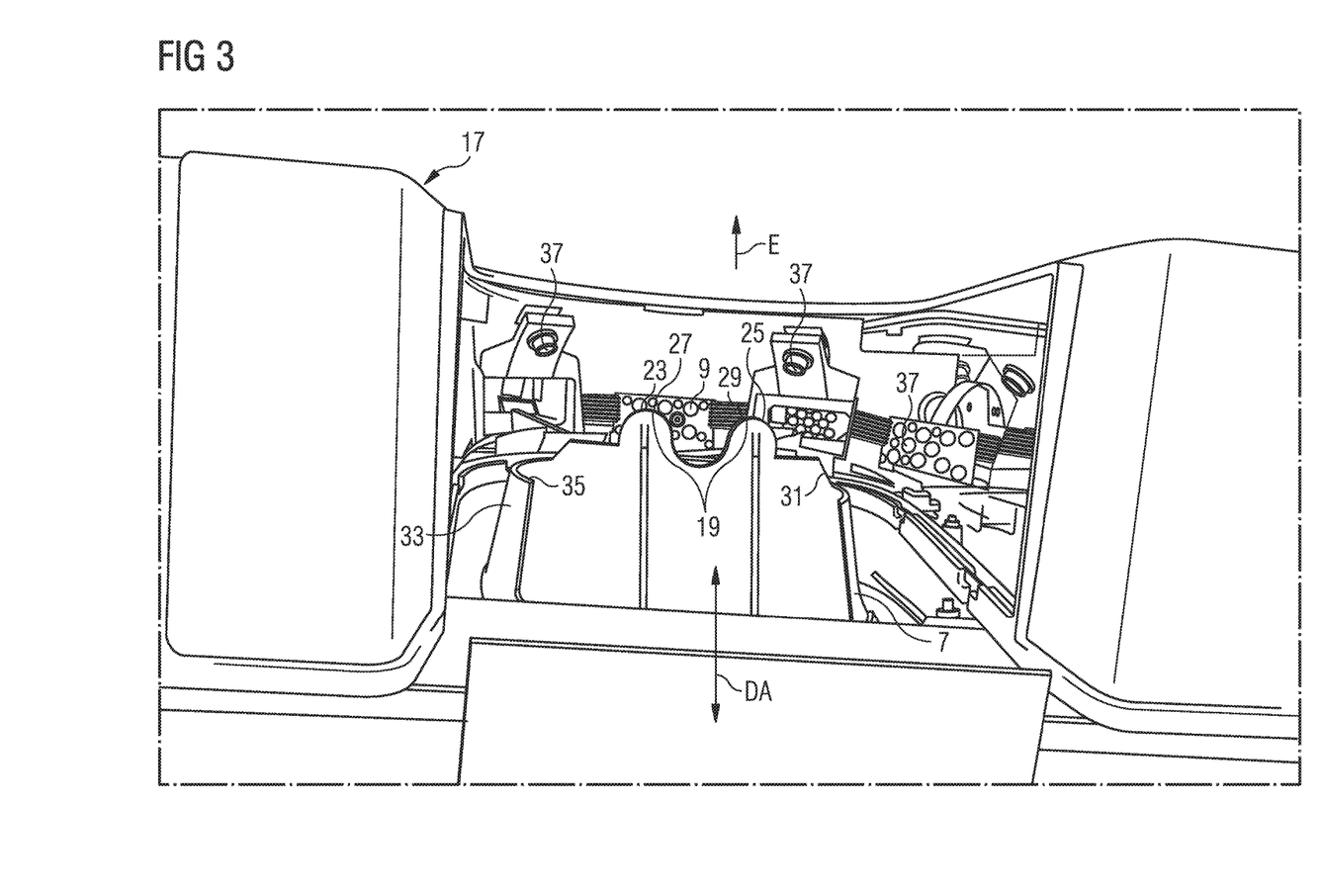
FIG. 3 shows a view from below onto the opened (front) apparatus door of the return device for empties of FIG. 1 and FIG. 2.

Referring to FIG. 1 to FIG. 3, a return device for empties 1 according to a first embodiment has a device housing 3 which has a housing wall 5 which presently is configured in the form of a pivotable (front) apparatus door; an empties-introduction opening 7 which is configured in the housing wall 5 and by way of which empties L (cf. FIG. 4, for example) are introducible along an introduction direction (arrow) E into the return device for empties 1, said introduction direction (arrow) E running at least substantially perpendicularly to the opening face, for example; a conveying mechanism 9 which is disposed in the device housing 3, for example disposed (in a stationary manner) in a housing body 11 of the device housing 9 that is separate from the housing wall 5 and by which (the) empties L (cf. FIG. 4, for example) that have been introduced by way of the empties-introduction opening 7 can be conveyed away (from the empties-introduction opening 7), wherein the conveying mechanism 9 has an empties-receptacle portion 13 which faces the empties-introduction opening 7 and by way of which the empties emanating from the empties-introduction opening 7 reach the conveying mechanism 9, wherein the empties-receptacle portion 13 is disposed so as to be adjacent to the empties-introduction opening 7 and spaced apart therefrom in the introduction direction (arrow) E at a spacing a (cf. FIG. 4, for example) such that a gap 15 (cf. FIG. 4, for example) that is defined by the spacing a is present between the empties-introduction opening 7 and the empties-receptacle portion 13; an optical detection device 17 which is disposed in the device housing 3 so as to be adjacent to the empties-introduction opening 7 and so as to be at least partially about the latter, so as to be able to optically detect in an at least substantially encircling manner (that is to say at least substantially by 360°) (in relation to a central passage axis of the empties-introduction opening 7) empties that are introduced by way of the empties-introduction opening 7; and a web 19 which in the introduction direction (arrow) E extends in a region between a lower portion 21 of the empties-introduction opening 7 and the empties-receptacle portion 13 of the conveying mechanism 9, so as to on account thereof be able to serve as a bearing for the empties L that in the introduction direction (arrow) E at least partially bridges the gap 15.

The risk of empties L inadvertently making their way into the gap 15, on account of which the introduction of empties L into the return device for empties 1 would otherwise become blocked, can be reduced by means of the web 19.

In the first embodiment illustrated in FIG. 1 to FIG. 3, the web 19 is configured as a double web, for example in the form of a double lip, having a first and a second lip 23, 25, said first and second lip 23, 25 each having a shape that is elongate in the introduction direction E and each extending along the introduction direction E from the empties-introduction opening 7 up to a free end portion 27, 29, and wherein the first and the second lip 23, 25 are disposed transversely to the introduction direction E at a mutual transverse lip spacing q such that empties L that are located on the web 19 are optically detectable by the optical detection device 17 also through an intermediate lip gap 31 that is defined by the transverse lip spacing q between the first and the second lip 23, 25. On account thereof, the risk of a reading error can be reduced, for example.

The two lips 23, 25 in relation to a central passage axis DA through the empties-introduction opening 7 in the plan view of the return device for empties 1 are at least substantially symmetrical.

In the case of the first embodiment illustrated in FIG. 1 to FIG. 3 the return device for empties 1 has a sleeve 33 which extends about the internal circumference of the empties-introduction opening 7 and which in a lower portion in the introduction direction E is extended in length by a sleeve appendage 35 which in the cross section (transversely to the introduction direction E) has an at least substantially U-shaped and/or trough-shaped and/or semicircular cross section, and emanating from which the web 19 by way of the two lips 23, 25 thereof is configured integrally, for example in a materially integral manner. Thus, the web 19 and/or the first and the second lip 23, 25 are correspondingly configured/connected integrally, for example in a materially integral manner, with the sleeve 15. The web 19 and/or the first and the second lip 23, 25 and/or the sleeve 33 are manufactured from a plastics material, for example.

The optical detection device 17 has a plurality of optical sensors 37 by means of which optical sensors 37 various identification features of the empties L are detectable at various circumferential positions, for example.

Figure 4:
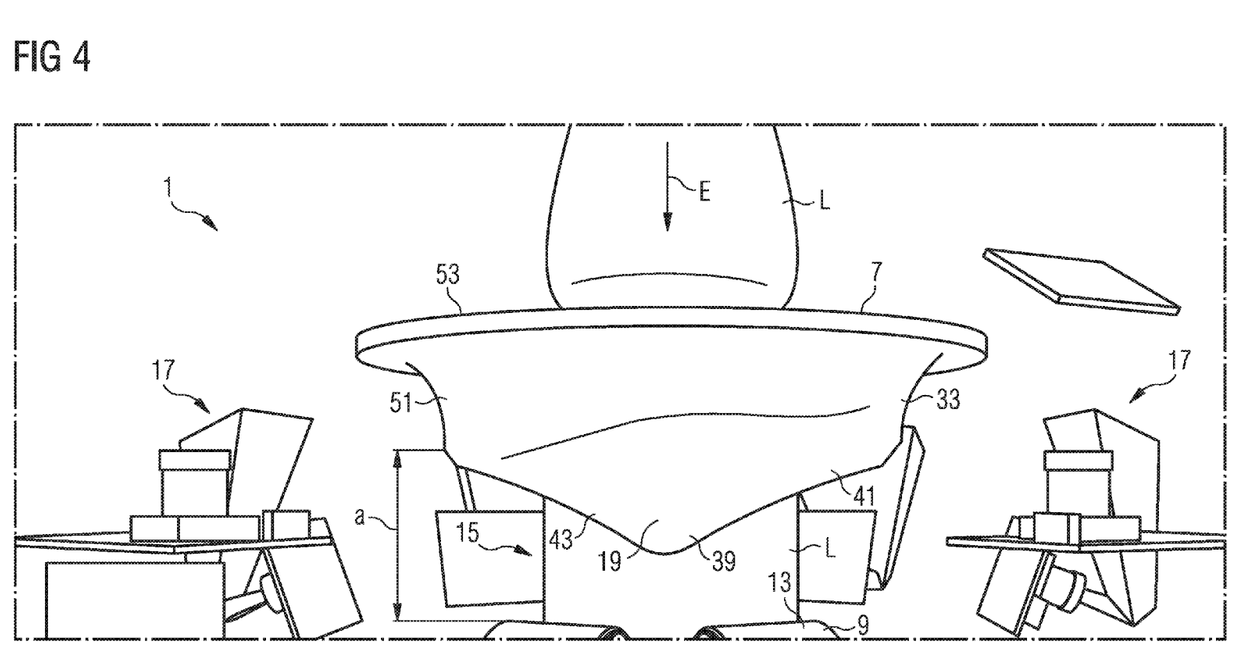
FIG. 4 shows a schematic view from below of a partial aspect of a return device for empties according to a second embodiment.

The second embodiment of a return device for empties 1, shown schematically in FIG. 4, can be configured substantially like the embodiment shown in FIG. 1 to FIG. 3, for example, wherein potential points of difference in the case of the second embodiment of FIG. 4 will be explained above all hereunder, reference otherwise being made to the above description pertaining to FIG. 1 to FIG. 3.

In the case of the second embodiment the web 19 that is configured to partially bridge the gap 15 between the empties-introduction opening and the empties-receptacle portion 13 of the conveying mechanism 9 is configured as a single web, for example as a lip which, emanating from the empties-introduction opening 7, in the introduction direction E (that is to say toward the empties-receptacle portion 13) tapers off up to a free end portion 39 that faces the empties-receptacle portion 13 (specifically in the width thereof (viewed in the plan view transversely to the introduction direction E, that is to say, for example, in the plan view of the device transversely to a passage axis DA (cf. FIG. 3) that runs centrically through the empties-introduction opening 7)), and herein specifically tapers off in a digressive manner, said free end portion 39 (when viewed in the plan view) transversely to the introduction direction E having a width b which at maximum is the size of half or a quarter of a mean diameter D and/or of a circumferential diameter (cf. FIG. 2) of the empties-introduction opening 7.

The return device for empties 1 according to the second embodiment has a sleeve 33, for example, which extends about the empties-introduction opening 7 and which has, for example, a tubular cylinder portion 51 that surrounds the empties-introduction opening 7, and a flange portion 53 that is integrally molded, that is to say molded in a materially integral manner, to the tubular cylinder portion 51 and, when viewed in the introduction direction E, is attached to the tubular cylinder portion 51 upstream of the latter. The web 19, that is to say in this case the single web, for example, and/or the (single) lip, are/is integrally molded, that is to say molded in a materially integral manner, for example, to the tubular cylinder portion 51 of the sleeve 33, specifically to a lower portion of the latter.

In the case of the second embodiment the lip (and thus the web 19 that is formed by the lip) digressively tapers off on both sides (transversely to the introduction direction E, when viewed in the plan view) such that the lip in the width direction has mutually opposite concave lateral peripheries 41, 43.

The optical detection device 17 can detect the lower side of empties that are located on/above the web 19 from obliquely below through the lateral clearances that are defined by the concave lateral peripheries 41, 43, on account of which the risk of a reading error can be reduced.

Figure 5:
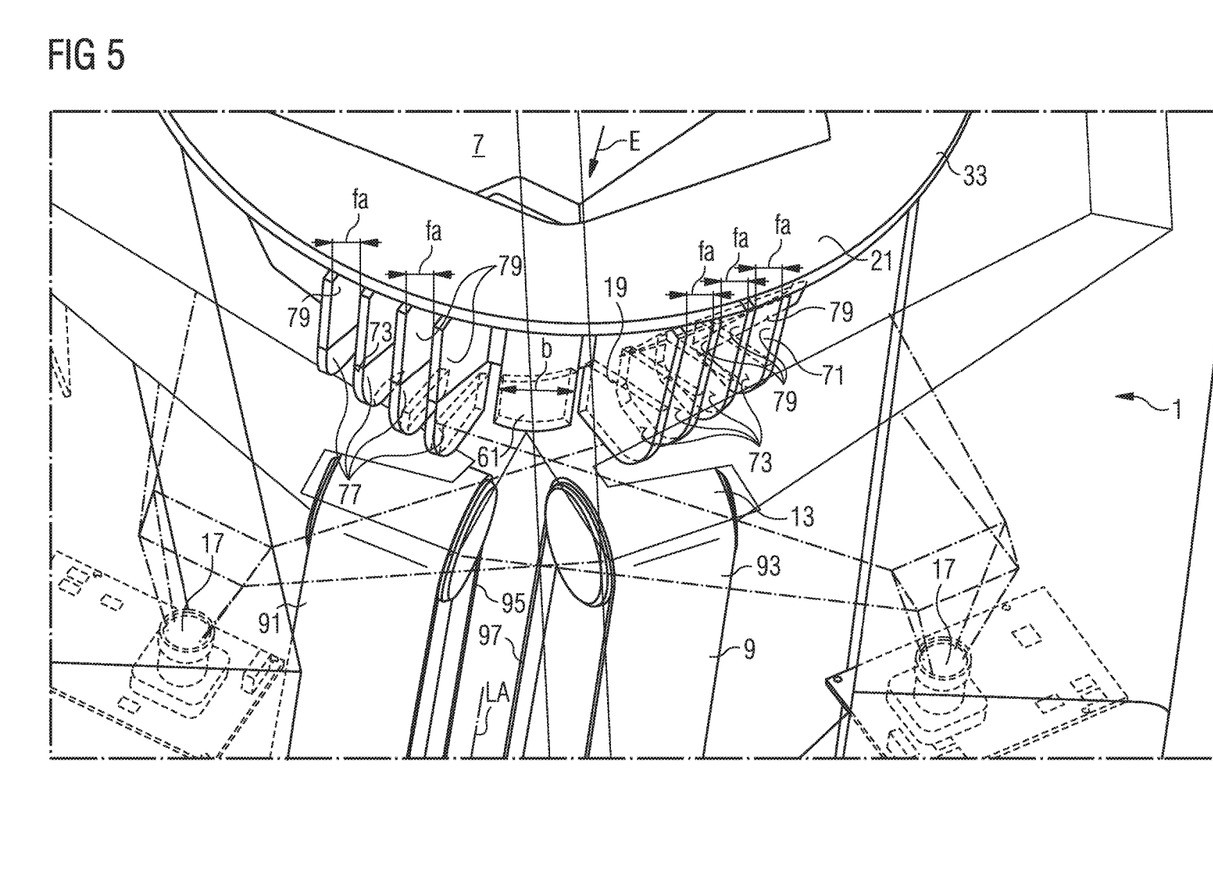
FIG. 5 shows a schematic view, obliquely from the front and from below, of a partial aspect of a return device for empties according to a third embodiment.
Figure 6:
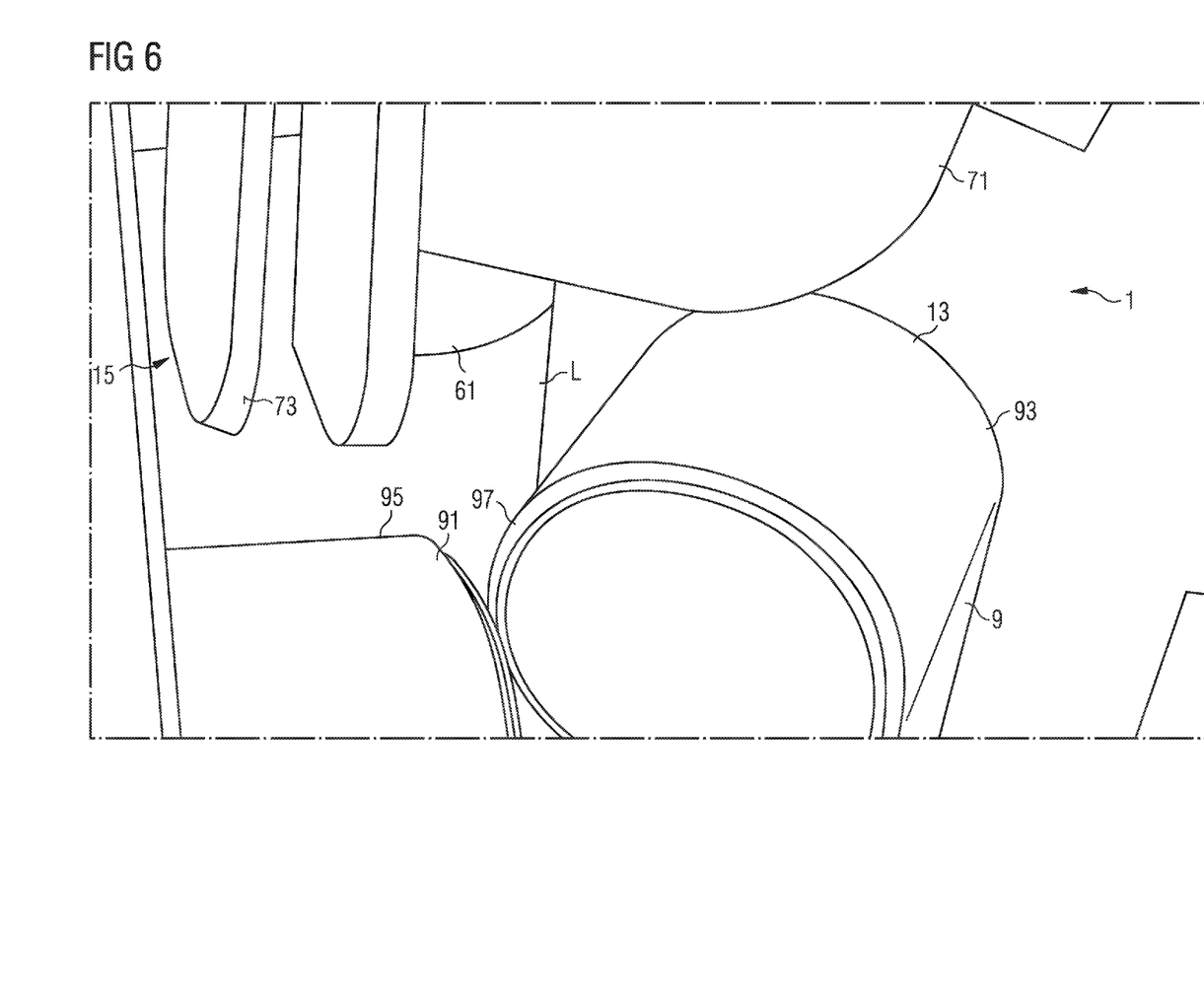
FIG. 6 shows a view of a detail, obliquely from the front and from below, of the partial aspect of the return device for empties of FIG. 5.

FIG. 5 and FIG. 6 show views of a third embodiment of a return device for empties 1, in a view obliquely from the front and from below, and in a detailed view onto the gap 15. The return device for empties 1 of FIG. 5 and FIG. 6 can be configured at least substantially like the return device for empties 1 according to the first and/or the second embodiment, such that the points of difference in relation to the preceding two embodiments will be explained above all hereunder, reference otherwise being made to the description pertaining to the previous embodiments with regard to a possible configuration.

In the case of the third embodiment according to FIG. 5 and FIG. 6 the return device for empties 1 has a sleeve 33 that extends about the empties-introduction opening 7, wherein the web 19 extends from a lower portion 21 of the empties-introduction opening 7 in the introduction direction E. The lower portion 21 of the empties-introduction opening 7 in this case is formed by a lower portion of the sleeve 33 on/from which the web 19 is configured, for example configured integrally/in a materially integral manner, and extends protruding freely in the introduction direction E in the direction toward the empties-receptacle portion 13 of the conveying mechanism 9, for example.

The web 19 in the case of the third embodiment has a web of elongate shape, for example a central web 61 which when viewed in the plan view (cf. FIG. 3) extends in and along the central passage axis DA which runs centrally through the empties-introduction opening 7. This web of elongate shape 61 from the lower portion 21 of the empties-introduction opening 7 and/or from the lower portion 21 of the sleeve 33 in a freely protruding manner in the empties-introduction direction E extends in the direction toward the conveying mechanism 9 and/or toward the empties-receptacle portion 13 of the latter. The width b of the web of elongate shape 61 is smaller than a quarter or smaller than an eighth of the mean diameter D (cf. FIG. 2) or of the circumferential diameter of the empties-introduction opening 7, for example.

A set of fins 71, 73, that is to say, for example, one first set of fins 71 and one second set of fins 73 which as such each define one fin face 75, 77, is disposed on each of both sides of the web of elongate shape 61, that is to say, when viewed in the plan view, on both sides of a longitudinal axis of the web of elongate shape, and/or when viewed in the plan view, on both sides of the passage axis DA. The fins 71, 73 of the first and of the second set of fins 71, 73 by way of the fin faces thereof extend at least substantially parallel with the introduction direction E and at least substantially radially to the empties-introduction opening 7, wherein the fins of the first set and of the second set of fins 71, 73 each are disposed so as to be mutually adjacent at fin spacings fa and so as to also be at least substantially mutually parallel, for example, such that empties L that are located on the web are optically detectable by the optical detection device 17 also through intermediate fin gaps 79 that are defined by the fin spacings fa between the fins 71, 73. The fins and/or the first and the second set of fins 71, 73 are disposed at a lateral spacing (transverse to the passage axis DA when viewed in the plan view) from the central web of elongate shape 61. Furthermore, the fins 71, 73 each are configured so as to be elongate in the introduction direction E, for example.

In the case of all embodiments the conveying mechanism 9 can have a first and a second conveyor belt 91, 93, for example, that are elongate in the introduction direction E, having a correspondingly elongate conveyor-belt face 95, 97. The conveyor belts 91, 93, for example in relation to a longitudinal axis LA that extends in the introduction direction E and/or parallel with the passage axis DA and runs between the conveyor belts and that in the plan view of the device runs through the center of the empties-introduction opening 7, extend at least substantially symmetrically, and the web 19 in relation to this longitudinal axis, for example, is likewise configured so as to be at least substantially symmetrical. That is to say that the web of elongate shape 61 in the case of the third embodiment extends symmetrically to the mentioned longitudinal axis LA, for example, and the first and the second set of fins 71, 73 in relation to the mentioned longitudinal axis, for example, are disposed and/or configured so as to be mutually symmetrical, for example mirror-symmetrical.

The conveyor-belt faces 95, 97 may be obliquely disposed while configuring a V-shaped cross section, for example, wherein the tip of the V in the plan view lies at least substantially on the passage axis DA of the empties-introduction opening 7.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A return device for empties, comprising:
   a device housing which has a housing wall;
   an empties-introduction opening which is configured in the housing wall and by way of which empties are introducible along an introduction direction into the return device for empties;
   a conveying mechanism which is disposed in the device housing and by which empties that have been introduced by way of the empties-introduction opening can be conveyed away, wherein the conveying mechanism has an empties-receptacle portion which faces the empties-introduction opening and by way of which the empties emanating from the empties-introduction opening reach the conveying mechanism, wherein the empties-receptacle portion is disposed so as to be adjacent to the empties-introduction opening and spaced apart therefrom in the introduction direction such that a gap that is defined by the spacing is present between the empties-introduction opening and the empties-receptacle portion;
   an optical detection device which is disposed in the device housing so as to be adjacent to the empties-introduction opening and so as to be at least partially about the latter, so as to be able to optically detect in an at least substantially encircling manner empties that are introduced by way of the empties-introduction opening; and
   a web which in the introduction direction extends in a region between a lower portion of the empties-introduction opening and the empties-receptacle portion of the conveying mechanism, so as to on account thereof be able to serve as a bearing for the empties that in the introduction direction at least partially bridges the gap,
   wherein the web is fixedly connected to the housing wall and extends from the lower portion of the empties-introduction opening in the direction toward the empties-receptacle portion.

2. The return device for empties of claim 1,
   wherein the web is fixedly connected to an internal surface of the empties-introduction opening by a sleeve which extends along the internal surface of the empties-introduction opening, and
   wherein the web extends in an integral manner from a lower portion of the sleeve in the empties-introduction direction.

3. The return device for empties of claim 1,
   wherein the web has a transparent material, or is configured from a transparent material, such that the optical detection device can optically detect empties that are located on the web through the web.

4. The return device for empties of claim 1,
   wherein the conveying mechanism has a first and a second conveyor belt that are elongate in the introduction direction, having a correspondingly elongate conveyor-belt face, wherein the conveyor belts in relation to a longitudinal axis that extends in the introduction direction and runs between the conveyor belts and that in the plan view of the device runs through the center of the empties-introduction opening are disposed so as to be at least substantially symmetrical, and wherein the web, likewise in relation to this longitudinal axis, is configured so as to be at least substantially symmetrical.

5. The return device for empties of claim 1,
   wherein the web has a double lip, or is formed by a double lip, having a first and a second lip, which each extend from the empties-introduction opening in the introduction direction up to a free end portion, and wherein the first and the second lip are disposed transversely to the introduction direction at a mutual transverse lip spacing such that empties that are located on the web are optically detectable by the optical detection device also through an intermediate lip gap that is defined by the transverse lip spacing between the first and the second lip.

6. The return device for empties of claim 1,
   wherein the web has a first set and a second set of fins that are disposed so as to be mutually adjacent at a fin spacing and have a respective fin face, said fins by way of the fin faces thereof each extending at least substantially parallel with the introduction direction and at least substantially radially to the empties-introduction opening such that empties that are located on the web are optically detectable by the optical detection device also through intermediate fin gaps that are defined by the fin spacings between the fins.

7. The return device for empties of claim 6,
   wherein the web at least in part has a shape that is elongate in the introduction direction, having a width which at maximum is the size of at least one of half or a quarter of a mean diameter or of a circumferential diameter of the empties-introduction opening; and
   wherein the first set of fins and the second set of fins are disposed on mutually opposite sides of the web of elongate shape.

8. The return device for empties of claim 1 wherein the empties-introduction opening is generally circularly shaped in a direction that is substantially perpendicular to the longitudinal axis extending in the introduction direction.

9. The return device for empties of claim 8,
   wherein the web has a lip, or is formed by a lip, which from the introduction opening tapers off along the introduction direction up to a free end portion that faces the empties-receptacle portion and transversely to the introduction direction has a width which at maximum is at most the size of the larger of half of a mean diameter or half of a circumferential diameter of the empties-introduction opening.

10. The return device for empties of claim 9,
    wherein the lip digressively tapers off on both sides such that the lip in the width direction has mutually opposite concave lateral peripheries.

11. The return device for empties of claim 8,
    wherein the web at least in part has a shape that is elongate in the introduction direction, having a width which at maximum is at most the size of half of a mean diameter or half of a circumferential diameter of the empties-introduction opening.

\* \* \* \* \*